United States Patent
Joisson et al.

(10) Patent No.: US 7,428,274 B2
(45) Date of Patent: Sep. 23, 2008

(54) RECEIVER OF FREQUENCY-MODULATED SIGNALS WITH DIGITAL DEMODULATOR

(75) Inventors: Marc Joisson, Grenoble (FR); Luc Garcia, Saint Paul de Varces (FR); Sebastien Leveque, La Cote Saint Andre (FR)

(73) Assignee: STMicroelectronics S.A., Montrouge (FR)

( * ) Notice: Subject to any disclaimer, the term of this patent is extended or adjusted under 35 U.S.C. 154(b) by 563 days.

(21) Appl. No.: 10/153,000

(22) Filed: May 22, 2002

(65) Prior Publication Data

US 2003/0118129 A1   Jun. 26, 2003

(30) Foreign Application Priority Data

May 23, 2001 (FR) .................................. 01 06766

(51) Int. Cl.
*H03D 3/00* (2006.01)
*H04L 27/14* (2006.01)
(52) U.S. Cl. .................... 375/334; 375/355; 375/376
(58) Field of Classification Search ................ 375/316, 375/329, 333, 334, 344, 354, 362, 373, 376, 375/355
See application file for complete search history.

(56) References Cited

U.S. PATENT DOCUMENTS 4,485,347 A * 11/1984 Hirasawa et al. ............ 329/303
5,550,505 A * 8/1996 Gaus, Jr. ..................... 329/300
5,818,881 A * 10/1998 Guiffant et al. ............. 375/334
5,822,378 A * 10/1998 Van Veldhuizen ........... 375/334
6,294,936 B1 * 9/2001 Clementi .................... 327/156
6,687,320 B1 * 2/2004 Chiu et al. .................. 375/376
2005/0107055 A1 * 5/2005 Bult et al. ................. 455/234.1

FOREIGN PATENT DOCUMENTS

DE         4210265      *  9/1993
EP       0 564 426 A1    10/1993

OTHER PUBLICATIONS

A VLSI Demodulator for Digital RF Network Applications: Theory and Results, Oct. 1990, IEEE Journal on Selected Areas in Communicaitons, vol. 8, No. 8, pp. 1500-1511.*
http://en.wikipedia.org/wiki/Phase-locked_loop.*
French Preliminary Search Report dated Feb. 12, 2002 for French Patent Application No. 0106766.

* cited by examiner

*Primary Examiner*—Chieh M. Fan
*Assistant Examiner*—Freshteh N. Aghdam
(74) *Attorney, Agent, or Firm*—Lisa K. Jorgenson; Jose Gutman; Fleit Gibbons Gutman Bongini & Bianco P. L.

(57) ABSTRACT

A receiver of a frequency-modulated signal representing a digital signal includes a down conversion unit or frequency translation unit to lower the frequency of the frequency-modulated signal and a digital demodulator to regenerate the digital signal from the lowered-frequency signal. The receiver furthermore includes a counter circuit to determine the number of periods of a reference signal from the frequency translation unit during a period of the lowered-frequency signal. The digital demodulator includes a computer unit to compute the period of the lowered-frequency signal from the number of periods of the reference signal.

13 Claims, 2 Drawing Sheets

RECEIVER OF FREQUENCY-MODULATED SIGNALS WITH DIGITAL DEMODULATOR

CROSS-REFERENCE TO RELATED APPLICATION

This application is based upon and claims priority from prior French Patent Application No. 0106766, filed on May 23, 2001, the entire disclosure of which is herein incorporated by reference.

BACKGROUND OF THE INVENTION

1. Field of the Invention

The present invention relates to a receiver of frequency-modulated signals with digital demodulator. The invention can be applied in all radio link systems.

2. Description of the Related Art

Frequency modulation or frequency shift keying is a technique commonly used to transmit a digital signal from a transmitter to a receiver by associating a particular modulation frequency with each digital value of the digital signal. In the case of a binary signal, a frequency f1 is assigned to the value 0 and a frequency f2 is assigned to the value 1. The transmitter has a modulator that sends out the modulation frequency associated with each digital value and the receiver has a digital demodulator responsible for restoring the binary values of the digital signal by discriminating between the modulation frequencies of the modulated signal received.

The demodulation of such signals consists, for example, in measuring the period of the signal received by sampling it at a very high frequency to detect the passages of the signal to zero and to compare the period value measured with period values corresponding to the different modulation frequencies. The precision of the measurement requires that the frequency of the sampling signal should be far higher than the modulation frequencies of the signal received. In other words, it should be far higher than the frequencies f1 and f2 in the case of a binary signal. The sampling frequency is then all the higher as the frequencies f1 and f2 are high. The sampling frequency must also be especially high when the frequencies f1 and f2 are close to each other so that the demodulator can accurately discriminate between them. Thus, in order avoid a situation where the sampling frequency needed is too high, the frequency of the received signal is generally lowered to an intermediate frequency of lower value by means of a frequency down conversion unit or frequency translation unit placed upline with respect to the digital demodulator in the receiver.

A receiver of this kind, referenced 10, is shown in FIG. 1. Generally, it has an antenna 11 to pick up a frequency shift keyed analog signal E(t), a first frequency translation unit 12 to lower the frequency of the signal E(t) and deliver a signal E'(t), a digital demodulator 13 to demodulate the signal E'(t) and deliver a digital signal N(t) representing the frequency-modulated signal E(t), and a clock circuit 23 to generate a high-frequency sampling signal ECH (with a frequency far higher than that of the signal E'(t) intended for the digital demodulator.

To lower the frequency of the signal E(t), the unit 12 has a local oscillator 14 that generates a local oscillator signal LO with a frequency $f_{LO}$ and a mixer circuit 15 that multiplies the signal E(t) with the signal LO. In this unit, the frequency of the signal E(t) is lowered by the value $f_{LO}$.

The local oscillator 14 classically comprises a reference oscillator 16 delivering a reference signal REF and a phase-locked loop. The phase-locked loop comprises a two-input phase comparator 17 receiving the reference signal REF at a first input and a loop signal RT at a second input. The signal at output of the phase comparator 17 is filtered by a low-pass filter 18 and then processed by a voltage-controlled oscillator 19. The signal delivered by the voltage-controlled oscillator 19 is applied to the second input of the mixer circuit 15. It also has its frequency divided by a first frequency counter/divider 20. This counter/divider 20 divides the frequency of the signal LO by N or N+1 as a function of a control signal CMD (N is an integer). It delivers a signal CK whose frequency is itself divided by a second counter/divider 21. The signal coming from the counter/divider 21 is the loop signal RT that is applied to the second input of the phase comparator 17. A third counter/divider 22 is furthermore used to generate the control signal CMD. The counter/divider 22 receives the signal CK and a reset signal RAZ coming from the counter/divider 21. The counters/dividers 21 and 22 are presettable counters for which it is possible to modify the boundary value of the counting. In the example of FIG. 1, the counter/divider 21 is designed to count up to A and the counter/divider 22 up to B, with A>B. The working of this phase-locked loop is well known to those skilled in the art.

The counters 21 and 22 count the pulses of the signal CK. So long as the counter 22 has not reached the value B, the counter/divider 20 divides the frequency of the signal LO by N+1. It then divides the frequency of the signal LO by N until the counter 21 reaches the value A. The counter/divider 21 then resets the counter/divider 22 by means of the signal RAZ.

In the event of frequency shift keying with frequency hopping, the values A and B vary periodically and randomly in order to periodically modify the frequency of the signal LO.

A first aim of the invention is to optimize the size on silicon of such a receiver. This is why, according to the invention, it is sought to make a receiver that has no clock circuit to generate the sampling signal. Indeed, this clock circuit occupies a non-negligible surface on silicon. Furthermore, it consumes current and may create parasitic noises for the other elements of the receiver.

Another aim of the invention is to generate a precise measurement of the period of the signal E'(t).

Another aim of the invention is to propose a digital receiver that is simple in design.

According to the invention, means are provided in the local oscillator of the receiver and in the digital demodulator to compute the period of the lowered-frequency signal E'(t).

Accordingly, there exists a need for overcoming the disadvantages of the prior art as discussed above.

SUMMARY OF THE INVENTION

Thus, the invention relates to a receiver of a frequency-modulated signal representing a digital signal comprising a frequency translation unit to lower the frequency of the frequency-modulated signal and a digital demodulator to regenerate the digital signal from the lowered-frequency signal wherein the receiver furthermore comprises counting means to determine the number of periods of a reference signal from the frequency translation unit during a period of the lowered-frequency signal and wherein the digital demodulator comprises computation means to compute the period of the lowered-frequency signal from the number of periods of the reference signal.

The reference signal is, for example, the signal CK generated by the local oscillator 14 of FIG. 1.

BRIEF DESCRIPTION OF THE DRAWING

Other features and advantages of the invention shall appear from the following detailed description made with reference to the appended drawings of which.

DESCRIPTION OF THE PREFERRED EMBODIMENTS

Hereinafter in the description, $T_{LO}$ and $f_{LO}$ designate the period and the frequency of the signal LO. Similarly, $T_{CK}$ and $f_{CK}$ designate the period and the frequency of the signal CK.

It is planned, according to the invention, to measure the period of the signal E'(t) by counting the number of periods of the signal CK during a period of the signal E'(t). Now, given that the instantaneous period of the signal CK is not constant ($T_{CK}$ is equal to $N \times T_{LO}$ or $(N+1) \times T_{LO}$), it is planned to count firstly the periods $T_{CK}$ whose duration is equal to $N \times T_{LO}$ and, secondly, the periods $T_{CK}$ whose duration is equal to $(N+1) \times T_{LO}$. It will thus be possible to obtain a precise measurement of the period of the signal E'(t). Hereinafter in the description, T1 designates the duration $N \times T_{LO}$ and T2 designates the duration $(N+1) \times T_{LO}$.

Figure 1:
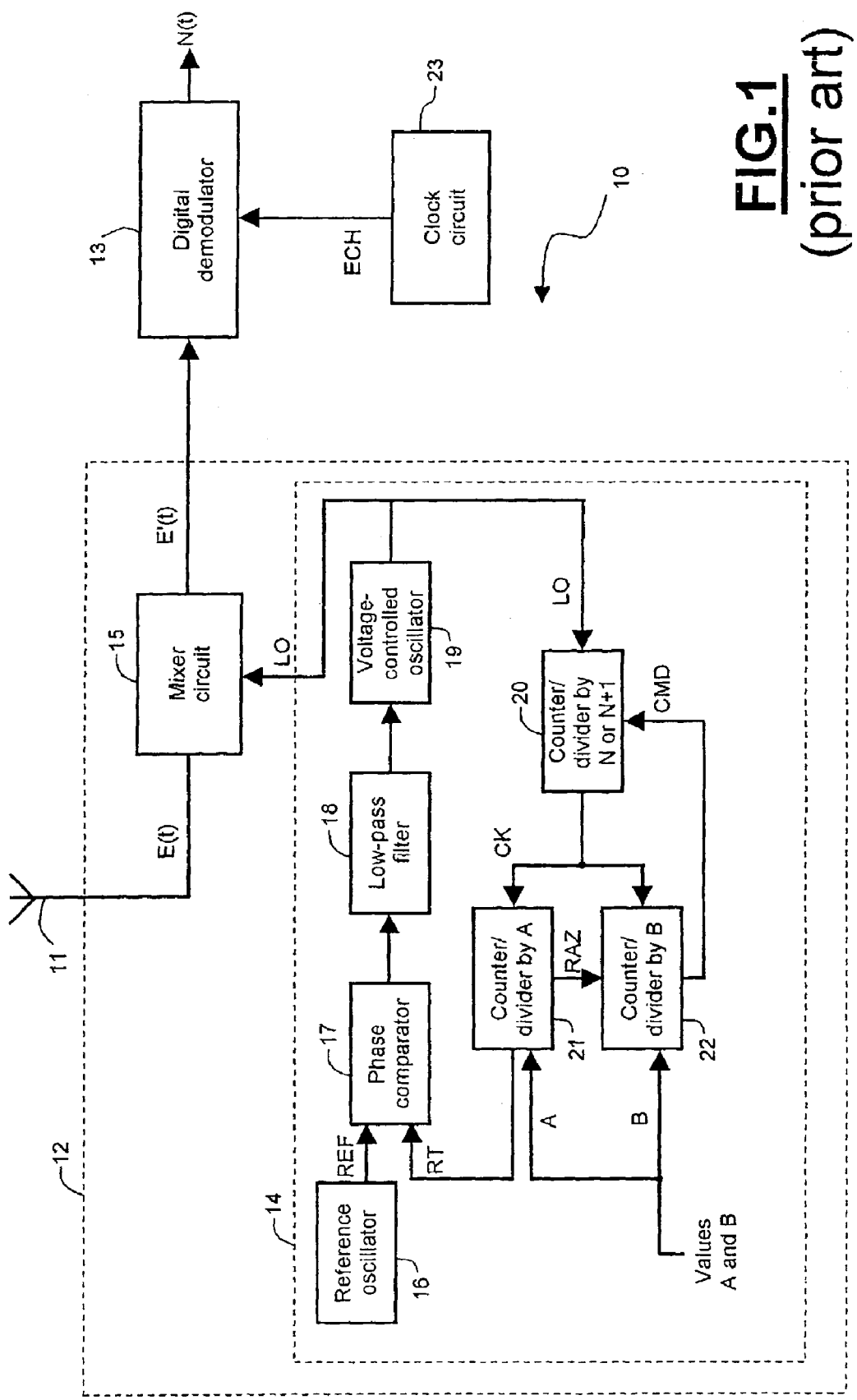
FIG. 1, already described is a detailed drawing of a prior art digital receiver.
Figure 2:
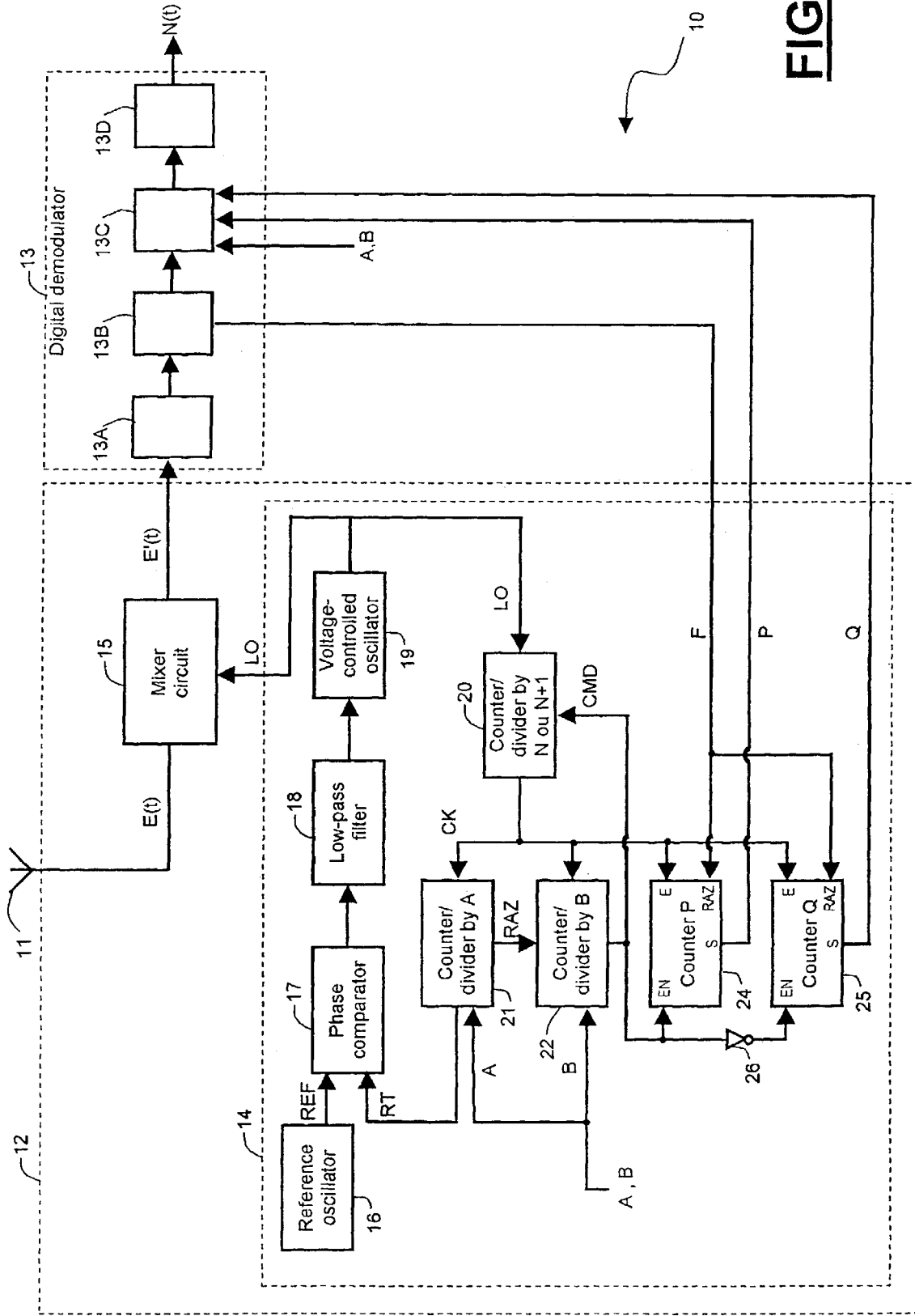
FIG. 2 is a detailed drawing of a digital receiver according to the invention.

To this end, the local oscillator 14 comprises two counters in addition to the elements of FIG. 1:

a first counter, 24, to count a number P of periods $T_{CK}$ with a duration T1 during a period of the signal E'(t), a second counter, 25, to count a number Q of periods $T_{CK}$ with a duration T2 during a period of the signal E'(t).

The period, referenced T, of the signal E'(t) is then obtained by performing the following computation:

$$T = P \times T1 + Q \times T2 = [P \times N + Q \times (N+1)] \times T_{LO}$$

Each of the counters 24 and 25 has an enabling input EN, a counting input E, a resetting input RAZ and a counting output S. The digital demodulator 13 furthermore has means 13A to convert the signal E'(t) into a logic signal, means 13B to detect the transitions of the logic signal (namely the leading edges or the trailing edges of this signal), means 13C to compute the period T from the numbers P and Q and means 13D to compare the computed period with the period values corresponding to the particular digital values and thus reconstitute the digital signal before modulation N(t).

The detection means 13B give the counters 24 and 25 a signal F active at each leading edge (or at each trailing edge) of the signal E'(t).

In this example, the signal CMD is considered to have a high level when the counter/divider 20 performs a division by N. The signal CMD is applied to the enabling input EN of the counter 24. This signal is furthermore inverted by an inverter circuit 26 and then applied to the enabling input EN of the counter 25. The signal F is applied to the resetting input RAZ of the counters 24 and 25. Finally, the signal CK is applied to the counting inputs E of these two counters.

Thus, when the counter/divider 20 divides the frequency of the signal by N, the counter 24 counts the periods of the signal CK. The result P is delivered by the output S of the counter 24. Similarly, when the counter/divider 20 divides the frequency of the signal by N+1, the counter 25 counts the periods of the signal CK. The result Q is delivered by the output S of the counter 25. The values P and Q are reset each time that the signal F is active.

Before each reset operation, the values P and Q are loaded into the digital demodulator 13. The values A and B, representing the period $T_{LO}$, are also given to the means 13C. The means 13C are then capable of computing the period T from the values P and Q. In one variant, the signal LO may be given directly in place of the values A and B in order to determine the value $T_{LO}$.

In practice, the receiver is made in the form of an integrated circuit.

What is claimed is:

1. A receiver of a frequency-modulated signal representing a digital signal comprising:

a frequency translation unit comprising a single local oscillator including a divider, wherein the single local oscillator generates both a local oscillator signal and a reference signal, the reference signal having a frequency derived by the divider dividing a frequency of the local oscillator signal by a value, and a mixer circuit that multiplies the received frequency-modulated signal with the local oscillator signal to lower the frequency of the received frequency-modulated signal to provide a lowered-frequency signal;

a digital demodulator to regenerate the digital signal from the lowered-frequency signal, wherein the frequency translation unit comprises counting means to determine the number of periods of the reference signal during a period of the lowered-frequency signal and wherein the digital demodulator comprises computation means to compute the period of the lowered-frequency signal from the number of periods of the reference signal; and wherein the duration of the period of the reference signal is variable and may take two possible values, T1 and T2; and further wherein the counting means comprises a first counter to count a number P of periods with a duration T1 of the reference signal during a period of the lowered-frequency signal and a second counter to count a number Q of periods with a duration T2 of the reference signal during a period of the lowered-frequency signal, and wherein the computation means of the digital demodulator computes the period of the lowered-frequency signal by adding the number of P periods and the number of Q periods.

2. A receiver according to claim 1, wherein the digital demodulator further comprises means to convert the lowered-frequency signal into a logic signal and means to detect the leading edges of the logic signal, the first and second counters being reset at each leading edge of the logic signal.

3. A receiver according to claim 1, wherein the digital demodulator further comprises means to convert the lowered-frequency signal into a logic signal and means to detect the trailing edges of the logic signal, the first and second counters being reset at each trailing edge of the logic signal.

4. A receiver according to claim 1, made in the form of an integrated circuit.

5. An electrical circuit comprising:

a receiver circuit for receiving a frequency-modulated signal representing a digital signal;

a frequency translation unit, electrically coupled to the receiver circuit, comprising a single local oscillator that generates both a local oscillator signal and a reference signal having a frequency derived by a divider in the single local oscillator dividing a frequency of the local oscillator signal by a value N, and a mixer circuit that multiplies the received frequency-modulated signal with the local oscillator signal for lowering the frequency of the received frequency-modulated signal to provide a lowered-frequency signal;

a digital demodulator, electrically coupled to the frequency translation unit, for regenerating the digital signal from the lowered-frequency signal;

counting means, electrically coupled to the receiver circuit and to the frequency translation unit, for determining the number of periods of the reference signal during a period of the lowered-frequency signal;

computation means, electrically coupled to the digital demodulator, for computing the period of the lowered-frequency signal from the number of periods of the reference signal; and wherein the duration of the period of the reference signal is variable and may take two possible values, T1 and T2; and further wherein the counting means comprises:

a first counter to count a number P of periods with a duration T1 of the reference signal during a period of the lowered-frequency signal; and a second counter to count a number Q of periods with a duration T2 of the reference signal during a period of the lowered-frequency signal, and wherein the computation means computes the period of the lowered-frequency signal by adding the number of P periods and the number of Q periods.

6. The electrical circuit of claim 5, wherein the digital demodulator comprises:

means to convert the lowered-frequency signal into a logic signal; and means to detect the leading edges of the logic signal.

7. The electrical circuit of claim 5, wherein the first and second counters are reset at each leading edge of the logic signal.

8. The electrical circuit of claim 5, wherein the digital demodulator further comprises means to convert the lowered-frequency signal into a logic signal and means to detect the trailing edges of the logic signal.

9. The electrical circuit of claim 5, wherein the first and second counters are reset at each trailing edge of the logic signal.

10. The electrical circuit of claim 5, made in the form of an integrated circuit.

11. The electrical circuit of claim 5, in which N is an integer.

12. A frequency-modulated signal receiver integrated circuit comprising:

a receiver circuit for receiving a frequency-modulated signal representing a digital signal;

a frequency translation unit, electrically coupled to the receiver circuit, comprising a single local oscillator that generates a local oscillator signal and a reference signal having a frequency derived by a divider in the single local oscillator dividing a frequency of the local oscillator signal by a value N, and a mixer circuit that multiplies the frequency-modulated signal with the local oscillator signal for lowering the frequency of the received frequency-modulated signal to provide a lowered-frequency signal;

a digital demodulator, electrically coupled to the frequency translation unit, for regenerating the digital signal from the lowered-frequency signal;

a reference signal generator, electrically coupled to the frequency translation unit, for providing a reference signal from the single local oscillator to the digital demodulator, and wherein the duration of the period of the reference signal is variable and may take two possible values, T1 and T2;

counting means, electrically coupled to the receiver circuit, to the reference signal generator and to the frequency translation unit, for determining the number of periods of the reference signal from the frequency translation unit during a period of the lowered-frequency signal;

computation means, electrically coupled to the digital demodulator, for computing the period of the lowered-frequency signal from the number of periods of the reference signal;

a first counter for counting a number P of periods with a duration T1 of the reference signal during a period of the lowered-frequency signal; and a second counter for counting a number Q of periods with a duration T2 of the reference signal during a period of the lowered-frequency signal, and wherein the computation means computes the period of the lowered-frequency signal by adding the number of P periods and the number of Q periods.

13. The frequency-modulated signal receiver integrated circuit of claim 12, in which N is an integer.

* * * * *